United States Patent
Cheong et al.

(10) Patent No.: US 6,897,900 B1
(45) Date of Patent: May 24, 2005

(54) DISPLAY APPARATUS COMPRISING A CATHODE RAY TUBE (CRT)

(75) Inventors: Yew Honn Cheong, Singapore (SG); Kyaw Nyunt Maung, Singapore (SG)

(73) Assignee: Thomson Licensing S.A., Boulogne-Billancourt (FR)

( * ) Notice: Subject to any disclaimer, the term of this patent is extended or adjusted under 35 U.S.C. 154(b) by 508 days.

(21) Appl. No.: 10/018,839

(22) PCT Filed: Jun. 14, 2000

(86) PCT No.: PCT/EP00/05450

§ 371 (c)(1),
(2), (4) Date: Dec. 19, 2001

(87) PCT Pub. No.: WO00/79789

PCT Pub. Date: Dec. 28, 2000

(51) Int. Cl.$^7$ ............................................. H04N 5/68
(52) U.S. Cl. ..................... 348/377; 348/379; 348/380
(58) Field of Search ................... 348/377, 378, 348/379, 380, 739, 776, 805, 808; 345/10, 22; 315/379, 380, 381, 382.1, 411, 1; H04N 5/68

(56) References Cited

U.S. PATENT DOCUMENTS

| | | | |
|---|---|---|---|
| 4,056,758 A | 11/1977 | Schaas | 315/381 |
| 4,689,684 A * | 8/1987 | Inashima et al. | 348/377 |
| 4,742,392 A | 5/1988 | Hashimoto | 358/172 |
| 4,980,756 A | 12/1990 | Lagoni | 358/39 |
| 5,339,114 A | 8/1994 | Lagoni et al. | 348/673 |
| 5,671,016 A | 9/1997 | Suzuki | 348/377 |
| 5,978,041 A | 11/1999 | Masuda et al. | 358/39 |
| 6,285,143 B1 * | 9/2001 | Griepentrog | 315/381 |
| 6,541,927 B2 * | 4/2003 | Yamashita | 348/379 |
| 6,614,482 B1 * | 9/2003 | Griepentrog | 348/380 |

FOREIGN PATENT DOCUMENTS

| | | | |
|---|---|---|---|
| EP | 178 044 A2 | 4/1986 | H04J/5/14 |
| JP | 06284307 | 10/1994 | H04N/3/20 |
| JP | 08251503 | 9/1996 | H04N/5/45 |

OTHER PUBLICATIONS

Kenichi Nakajima et al., *Computer–Controlled NTSC Single–Chip LSI for Color TV*, 8087 IEEE Tranactions on Consumer Electronics 39(1993)Aug., No. 3, New York, pp. 429–434.

Search Report *.

* cited by examiner

*Primary Examiner*—Sherrie Hsia
(74) *Attorney, Agent, or Firm*—Joseph S. Tripoli; Harvey D. Fried; Sammy S. Henig

(57) ABSTRACT

A display apparatus, for instance a television receiver, comprises a cathode ray tube, a first circuit for providing a high voltage to the cathode and a second circuit receiving a gross signal and providing on at least an output at least a luminance signal controlling an electron stream of the cathode ray tube. To reduce stray emission, absence of gross signal is simulated when the apparatus is switched from on to off.

9 Claims, 2 Drawing Sheets

DISPLAY APPARATUS COMPRISING A CATHODE RAY TUBE (CRT)

CROSSED-REFERENCE TO RELATED APPLICATIONS

This application claims the benefit under 35 U.S.C. § 365 of International Application PCT/EP00/05450, filed Jun. 14, 2000, which claims the benefit of Singapore Patent Application No. 9902050.7, filed Jun. 19, 1999.

The invention relates to a display apparatus comprising a cathode ray tube (CRT).

In such an apparatus, stray emission may take place once the apparatus is switched off (or to standby) due to high voltages lingering in the CRT. This problem is conventionally addressed by reducing the voltages in the CRT when the apparatus is turned off. Various solutions are described in the patent application published as EP 0 810 785.

According to another solution, disclosed in the patent application published as JP 62-92 584, the black level adjustement voltage for a luminance signal sent to the CRT rises when the conventional B+ voltage falls.

BACKGROUND OF THE INVENTION

The goal of the invention is to improve the reduction of stray emission by discharging the cathode thanks to a new solution which can be used in addition to the preceding ones.

According to this new solution, a display apparatus comprises a cathode ray tube, a first circuit providing a high voltage to the cathode, a second circuit receiving a gross signal on a source input and providing on at least an output at least a luminance signal controlling an electron stream of the cathode ray tube, and means for simulating absence of gross signal when the apparatus switches from on to off.

According to preferred embodiments, said means for simulating absence of gross signal are triggered by a signal sent by a microprocessor;

a pin carrying a signal representative of the gross signal when the apparatus is on is connected to ground when the apparatus switches from on to off;

the second circuit comprises a comparator having an input connected to said source input and generating an error signal according to a difference between said comparator input and a reference signal, and controlled amplifying means for amplifying the gross signal into the luminance signal according to the error signal, and a signal simulating absence of gross signal is sent to the comparator input when the apparatus switches from on to off;

said signal simulating absence of gross signal is controlled by a signal sent by a microprocessor;

the comparator input is connected to ground when the apparatus switches from on to off;

the comparator input is connected to ground through a switch;

the switch is controlled by a signal from a microprocessor.

DESCRIPTION OF THE PRIOR ART

According to this solution, a display apparatus is provided, which comprises a cathode ray tube, a first circuit providing a high voltage to the cathode and a second circuit receiving a gross signal on a source input and providing on at least an output at least a luminance signal controlling an electron stream of the cathode ray tube, the second circuit comprising a comparator having an input connected to said source input and generating an error signal according to a difference between said comparator input and a reference signal, and controlled amplifying means for amplifying the gross signal into the luminance signal according to the error signal, wherein the comparator input is connected to ground through a switch controlled by a signal generated from a microprocessor when the apparatus switches from on to off.

The display apparatus is for instance a television receiver.

BRIEF DESCRIPTION OF THE DRAWINGS

The invention will now be explained in the light of the attached drawings and more specifically.

DETAILED DESCRIPTION OF THE INVENTION

Figure 1:
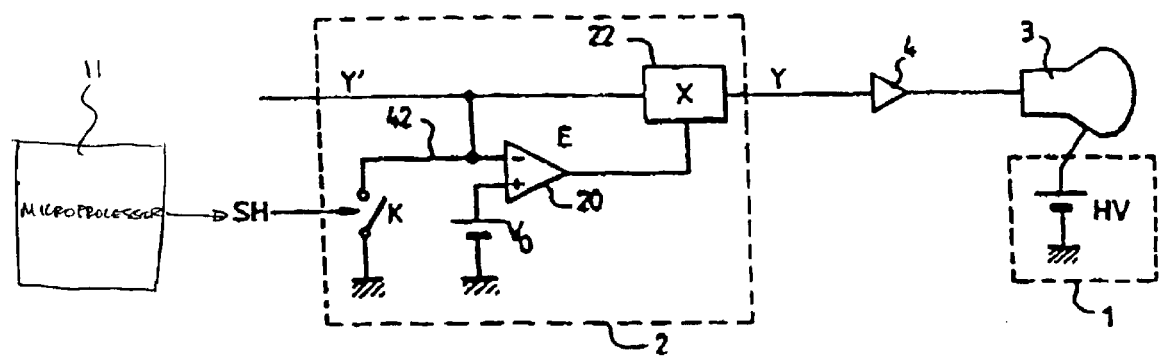
FIG. 1 schematically representing an embodiment of the invention.

As schematically shown in FIG. 1, a television receiver includes a cathode ray tube 3, a first circuit 1 for providing a high voltage HV to the cathode of the CRT 3 and a second circuit 2 for providing a luminance signal Y controlling the electron stream of the CRT 3. An amplifier 4 can be provided between the second circuit 2 and the CRT 3 to input a signal with a sufficient power to the CRT.

On colour television receivers (usually called CTV), three circuits similar to the second circuit 2 are provided respectively for red, green and blue parts of the image. The description below will only mention one circuit 2 but it should be understood that the invention can apply to any of the three circuit 2, and possibly to several at the same time.

The second circuit 2 processes the gross signal Y' from a video source, e.g. a tuner or a VCR, into the luminance signal Y. The second circuit 2 notably provides a brightness setting as follows.

During the horizontal blanking interval, reference signals (usually 2 reference signals) are transmitted to adjust the pedestal level and the brightness so that the luminance of the following horizontal line is displayed with the correct intensity.

Therefore the second circuit 2 includes a comparator 20 comparing the gross signal Y' (on a comparator input 42) to a reference signal $V_0$ during horizontal blanking intervals. If the gross signal Y' is not strong enough (that is the references transmitted during the horizontal blanking interval reveal a low signal), then the comparator generates an error signal E proportional to the need of amplifying the gross signal Y' to obtain the luminance signal Y. An amplifier 22 controlled by the error signal E amplifies the gross signal Y' into the luminance signal Y accordingly.

When the television receiver is switched off, a signal SH is sent by a microprocessor 11 of the receiver for contacting a switch K connected between the comparator input and the ground. The comparator input is then connected to the ground, thus simulating an absence of gross signal Y'. As a consequence, there is a boost in the error signal E, thus in the amplification by amplifier 22 and in the end in the luminance signal Y.

This boost in the luminance signal Y discharges the cathode of the CRT 3 whereto no more energy is supplied.

Figure 2:
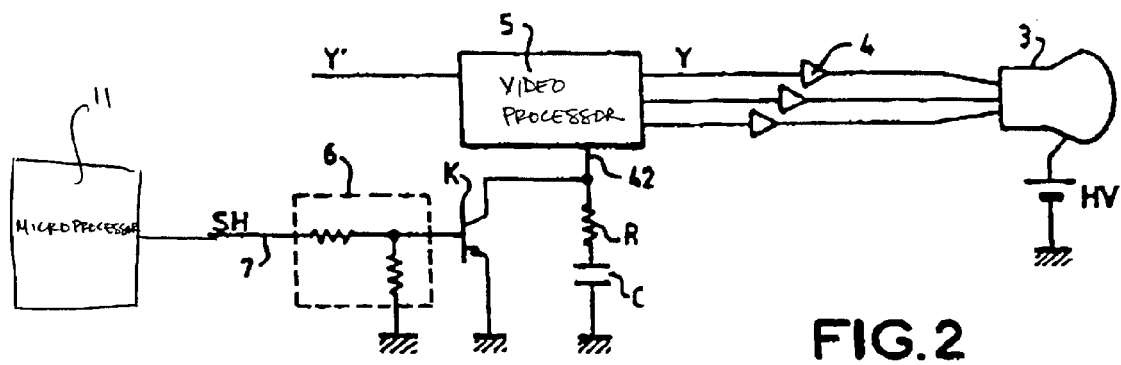
FIG. 2 representing a practical implementation of this embodiment.
Figure 3:
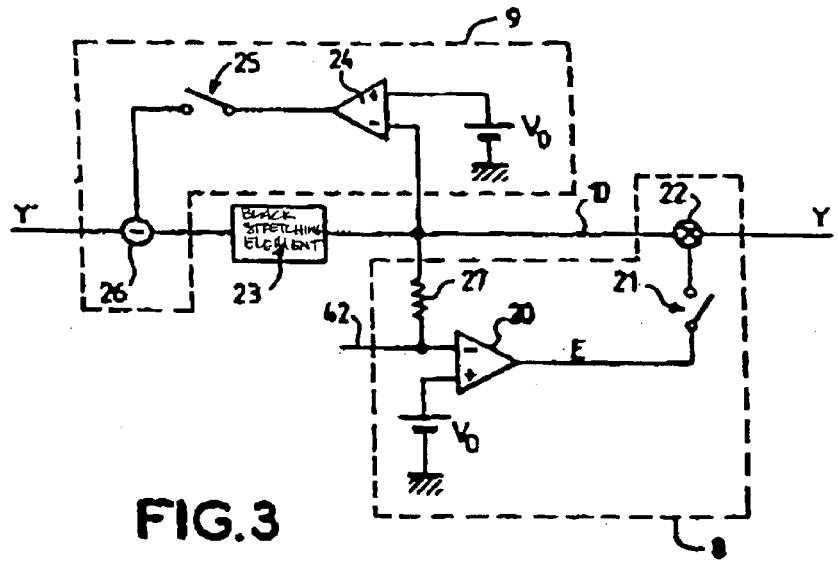
FIG. 3 representing a detailed view of a circuit of FIG. 2.

A practical way to implement this embodiment is described thereafter in relation to FIG. 2 and FIG. 3.

A video processor IC 5 is used for video signal processing. In the example, the video processor IC 5 is a TA1268N from Toshiba. The video IC 5 includes brightness setting means as described above, including notably a comparator whose input is represented under reference 42 (corresponding to pin 42 of TA1268N).

A resistor R (75 kΩ) and a capacitor C (1 $\mu$F) are connected in series (RC-circuit) and are interposed between the comparator input 42 and the ground. This RC-circuit provides averaging of the gross signal in order to obtain the signal to be compared to the reference signal for brightness setting purposes.

In parallel to the RC circuit, the comparator input 42 is connected to the ground through the emitter-transmitter path of a transistor K. The base of the transistor K is connected through a voltage divider 6 to a wire 7 providing the SH signal from the microprocessor of the receiver when the receiver is switched from on to off (or standby).

A detailed view of the part of the video processor IC 5 related to the invention is represented on FIG. 3. The video IC 5 includes a black stretching element 23, a brightness setting circuit 8 and a pedestal clamping circuit 9.

The clamping circuit 9 comprises a comparator 24 comparing the pedestal level of the gross signal Y' during the horizontal blanking time dedicated to the pedestal reference (that is when clamping switch 25 is closed) with a reference voltage $V_0$. The gross signal is corrected accordingly thanks to substractor 26.

The brightness setting circuit includes previously described comparator 20 and controlled amplifying means 22. A brightness switch 21 is links the output of comparator 20 (carrying error signal E) to the control pin of amplifying means 22; the brighness switch is closed only during horizontal blanking intervals, where the reference signals are received. An isolation resistor 27 is interposed between the input of comparator 20 and the wire 10 carrying the luminance signal.

What is claimed is:

1. Display apparatus comprising:

a cathode ray tube, a first circuit providing a high voltage to the cathode and a second circuit receiving a gross signal on a source input providing on at least an output at least a luminance signal controlling an electron beam of the cathode ray tube, wherein the second circuit comprises a comparator having an input connected to said source input and generating an error signal according to a difference between said comparator input and a reference signal, and controlled amplifying means for amplifying the gross signal into the luminance signal according to the error signal, and a signal simulating absence of gross signal and controlled by a signal sent by a microprocessor is sent to the comparator input when the apparatus switches from on to off.

2. Display apparatus according to claim 1, wherein a pin carrying a signal representative of the gross signal when the apparatus is on is connected to ground when the apparatus switches from on to off.

3. Display apparatus according to claim 1, wherein the comparator input is connected to ground when the apparatus switches from on to off.

4. Display apparatus according to claim 1, wherein the comparator input is connected to ground through a switch.

5. Display apparatus according to claim 4, wherein the switch is controlled by a signal from a microprocessor.

6. Display apparatus according to claim 1, wherein the apparatus is a television receiver.

7. Display apparatus comprising:

a cathode ray tube, a first circuit providing a high voltage to the cathode and a second circuit receiving a gross signal on a source input and providing on at least an output at least a luminance signal controlling an electron stream of the cathode ray tube, the second circuit comprising a comparator having an input connected to said source input and generating an error signal according to a difference between said comparator input and a reference signal, and controlled amplifying means for amplifying the gross signal into the luminance signal according to the error signal, wherein the comparator input is connected to ground through a switch controlled by a signal generated from a microprocessor when the apparatus switches from on to off.

8. Display apparatus according to claim 7, the apparatus being a television receiver.

9. Display apparatus comprising:

a cathode ray tube, a first circuit providing a high voltage to the cathode and a second circuit receiving a gross signal on a source input providing on at least an output at least a luminance signal controlling an electron beam of the cathode ray tube, wherein the second circuit comprises a comparator having an input connected to said source input and generating an error signal according to a difference between said comparator input and a reference signal, and controlled amplifying means for amplifying the gross signal into the luminance signal according to the error signal, and wherein a signal simulating absence of gross signal is sent to the comparator input when the apparatus switches from on to off.

* * * * *